Nov. 30, 1971   R. L. FRITZ ET AL   3,623,323
SPEED SYNCHRONIZING APPARATUS
Filed Nov. 28, 1969
2 Sheets-Sheet 1
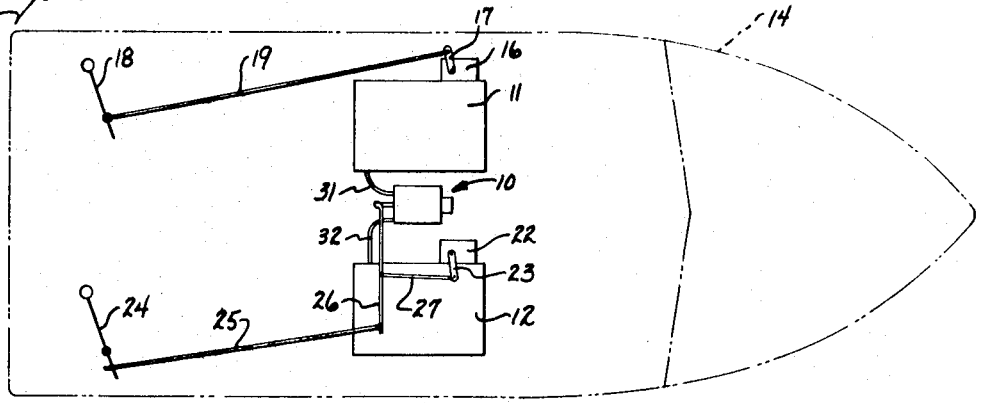
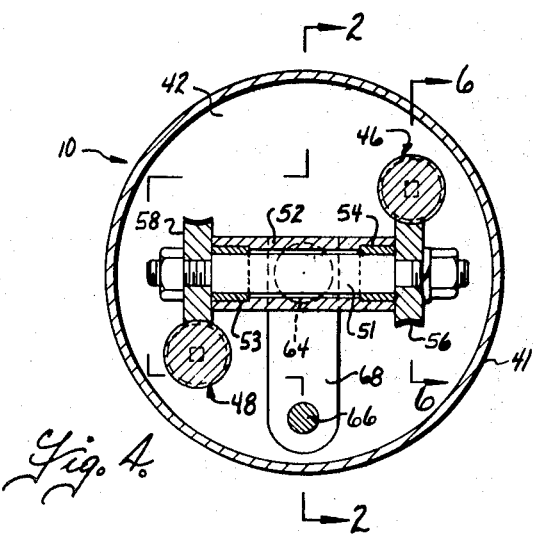
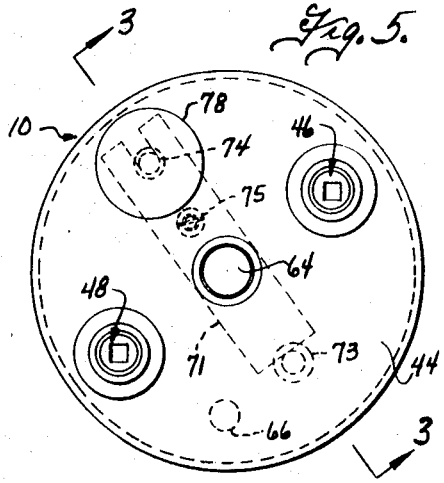
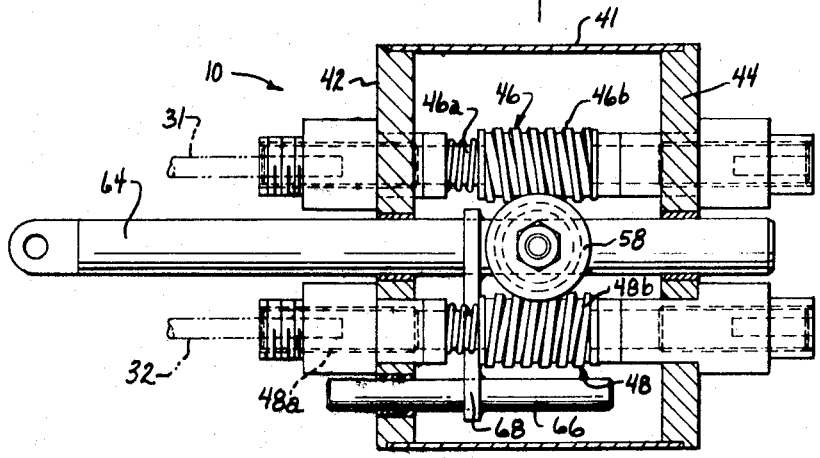
Inventors
Robert L. Fritz
Fred W. Newburgh
By
McCanna, Morsbach, Pillote & Muir
Attorneys United States Patent Office 3,623,323
Patented Nov. 30, 1971

3,623,323
SPEED SYNCHRONIZING APPARATUS
Robert L. Fritz and Fred W. Newburgh, Rockford, Ill.,
assignors to Arrow Machining Service, Rockford, Ill.
Filed Nov. 28, 1969, Ser. No. 880,692
Int. Cl. F01b *21/00;* F01k *23/00*
U.S. Cl. 60—97 S                                10 Claims

ABSTRACT OF THE DISCLOSURE

Two worm shafts, each having a driving connection to an engine, are mounted parallel to a shift rod which is movable to change the speed of the slave engine. A rotatable member is mounted on the shift rod and has worm gears at either end engaged with a respective worm shaft. A friction clutch is associated with each of the worm shafts to prevent imparting of motion to the rotatable member when the shift rod is held against movement. A solenoid-operated lock mechanism is selectively operable to lock the shift rod against movement and render the apparatus inoperative.

BACKGROUND

The invention pertains generally to power plants and more specifically to speed synchronizing apparatus for multiple engines.

Where multiple engines are utilized, as on a boat, it is frequently desirable that they operate at the same speed. Otherwise, when the engines are running out of synchronism, undesirable vibrations result. This causes reduced fuel efficiency and can damage the craft. Thus it is desirable that the speeds be synchronized. It is also desirable that any speed synchronizing apparatus be capable of being rendered inoperative when the engines are to be operated at different speeds, as when maneuvering the craft. The apparatus should also be arranged so that it can be over-ridden if necessary, as may be required in panic situations.

SUMMARY

The present invention relates to speed synchronizing apparatus for synchronizing the speed of a slave engine to that of a master engine.

It is a general object of the present invention to provide a speed synchronizing apparatus which is of more economical construction than others, which can be quickly and easily installed, and which is adaptable to numerous installations.

Another object is to provide a speed synchronizing apparatus which has means for rendering itself inoperative.

Still another object is to provide an apparatus of the character described which can be over-ridden without damaging the apparatus.

Yet another object of the present invention is to provide a speed synchronizing apparatus of a linear type which has a shift rod mounted for linear movement within predetermined limits, and which has means for preventing such linear movement when the apparatus is rendered inoperative or when it is over-ridden.

It is another object to provide an apparatus in accordance with the foregoing and having a clutching means to prevent damage when the shift rod is held against linear movement.

These, and other objects and advantages of the invention, will become apparent from the following description.

Drawings:

FIG. 1 is a schematic view showing the speed synchronizing apparatus of the present invention as applied to a multiple engine power plant;

FIG. 2 is a longitudinal sectional view taken generally along broken line 2—2 of FIG. 4;

Figure 3:
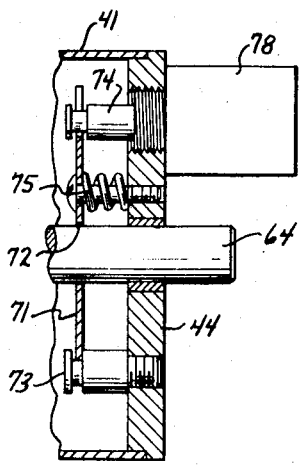

FIG. 3, on sheet two of the drawings, is a fragmentary longitudinal sectional view taken along line 3—3 of FIG. 5;

FIG. 4 is a cross-sectional view taken along line 4—4 of FIG. 2;

FIG. 5 is an end view as seen from the right side of FIG. 3; and

Figure 6:
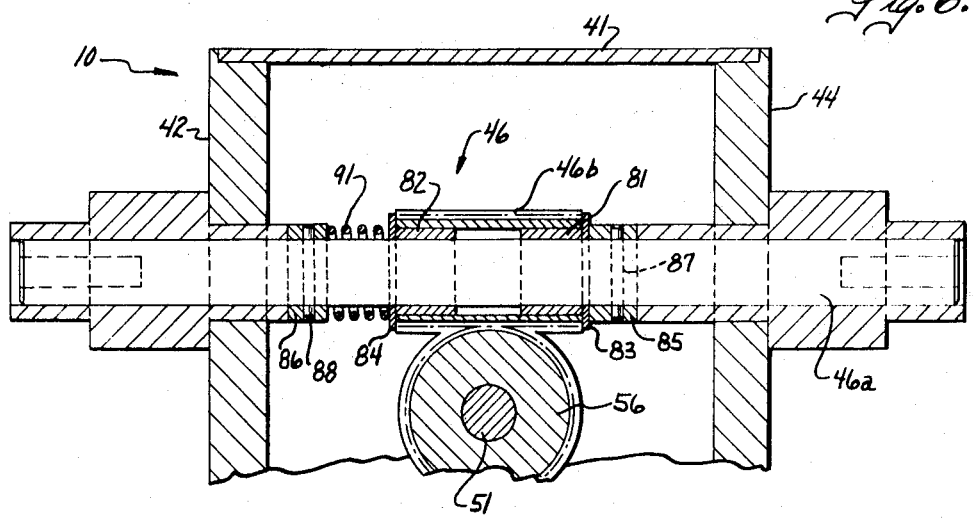

FIG. 6 is a fragmentary longitudinal sectional view taken along line 6—6 of FIG. 4 and on a larger scale.

DESCRIPTION

Reference is now made more particularly to the drawings wherein similar reference characters indicate the same parts throughout the several views.

As shown in FIG. 1 of the drawings, a speed synchronizing apparatus, generally designated 10, is employed in conjunction with a pair of prime movers 11 and 12. In this instance, the prime mover or engine indicated at 11 forms the master engine, and the prime mover or engine 12 forms the slave engine. These engines may be of any standard type, such as those employed in the operation of a marine craft 14. Each engine is provided with a speed control mechanism as, for example, a carburetor 16 having a throttle 17 under control of a manually operable control 18 through linkage 19. In the embodiment illustrated, slave engine 12 also has a carburetor 22 with a throttle 23 under control of a manual control 24 through linkage 25, 26 and 27. A governor could be used, if desired.

As shown, the carburetor 22 of the slave engine is adapted to be automatically operated by the speed synchronizing apparatus 10. In operation of the embodiment illustrated, the control levers 18 and 24 may be set so that the engines 11 and 12 are operating at approximately the same speed. The speed synchronizing apparatus 10 is connected to the engines 11 and 12 as by bowden wires 31, 32, respectively, to sense the speed of operation of the engines. The speed control mechanism, through operation on linkage 26, will automatically adjust and maintain the same rate of speed of the slave engine 12 as that of the master engine 11.

Turning now to FIGS. 2–6, the speed synchronizing apparatus 10 will be described in greater detail. Apparatus 10 includes a casing made up of a cylindrical portion 41, and end walls 42 and 44. First and second worm shaft assemblies, designated generally 46 and 48, extend between walls 42 and 44 and are rotatably mounted thereon. Worm shaft assembly 46 includes a rotatable shaft portion 46*a* and a worm portion 46*b* which is rotatably mounted on the shaft portion. Similarly, assembly 48 includes a shaft portion 48*a* and a worm portion 48*b*. The assemblies will hereinafter be described in greater detail. As can be seen, worm shaft assemblies 46 and 48 are preferably arranged in spaced parallel relation to each other. The worm shaft assemblies are arranged so that connection to the bowden wires 31 and 32 could be made at either end of the shaft portions 46*a*, 48*a*. In sensing the speed of their respective engines, bowden wires 31 and 32 can be conveniently connected to the tachometer takeoff of each engine. Thus each shaft portion 46*a*, 48*a*, is rotated in accordance with the speed of operation of its respective engine. These rotations are imparted to the respective worm portions 46*b*, 48*b*, as will be hereinafter described.

A carriage is mounted for limited linear movement in a direction parallel to the worm shaft assemblies and is operable for comparing the rotations of the assemblies so that a differential in their speed of rotation will cause relative linear movement of the carriage. The carriage includes a rotatable member 51 (see FIG. 4) passing through a member 52 and supported thereon by bearings 53 and 54. A worm gear 58 is mounted on one end of rotatable member 51 and in mesh with worm portion 48b so that rotation of shaft 48 is directly imparted to rotatable member 51. Another worm gear 56 is mounted at the other end of rotatable member 51 and in mesh with worm portion 46b to be thereby rotated.

Each worm shaft assembly 46 and 48 includes a friction clutch so that rotation of the shaft portion is ordinarily imparted to the respective worm portion and therefrom to the worm gears. As best seen in FIG. 6, worm portion 46b is rotatably mounted on shaft portion 46a as by bearings 81, 82. At the ends of the worm portion are thrust washers 83, 84. A pair of spacer members 85, 86 are secured to shaft portion 46a as by pins 87, 88, respectively. As shown, thrust washer 83 is engaged with spacer member 85; while thrust washer 84 is spaced from spacer member 86. Friction clutch means is interposed between thrust washer 84 and member 86; and, in the embodiment shown, is in the form of a helical loading spring 91 circumjacent the shaft portion 46a. If desired, the assembly can be arranged so that compression in the spring is adjustable. As can be seen in FIG. 2, worm shaft assembly 48 contains the identical parts as those described above for assembly 46, and additional description is deemed unnecessary. While the clutches are arranged to ordinarily impart rotation from the shaft portion to the respective worm portion, they are also operable to prevent such imparting of rotation when the carriage is held against linear movement as hereafter described.

When there is a difference in rotation between worm portions 46b and 48b, the differential in their speeds of rotation will cause relative linear movement of the carriage. A shift rod 64 is mounted parallel to the shafts 46 and 48 and is secured to member 52. The shift rod, in the embodiment illustrated, is attached to linkage 26 so that the movement of the shift rod 64 will cause an adjustment of throttle 23. In this manner, the differential of speed of rotation of shaft portions 46a and 48a, as transmitted to worm portions 46b and 48b, causes a linear movement of the carriage and this is imparted to an adjustment of the throttle of the slave engine to automatically adjust the speed of operation of the slave engine.

An auxiliary shaft 66 is slidably mounted in the casing and extends through wall 42. A member 68 is secured to shift rod 64 and shaft 66, as seen in FIG. 2. Member 68 and shaft 66, in this manner, cooperate to prevent rotation of the carriage and thereby keep the worm gears 66 and 58 in mesh with the worm portions.

Means is provided for holding the carriage against linear movement to thereby render the speed synchronizing apparatus inoperative. In one form, this means includes first and second spaced stops for engagement by the carriage at either end of the linear movement. While auxiliary stops may be utilized, the present embodiment utilizes end walls 42 and 44 for this purpose. When the carriage moves to the left as viewed in FIG. 2, member 68 engages wall 42 to limit the linear movement in that direction. When the carriage moves in the opposite direction, the end of shaft 66 engages wall 44. When either wall or stop is thus engaged by the carriage, either friction clutch can slip and prevent the aforementioned rotation, and the adjustment of the slave engine is ceased. However, should the differential in speeds of the engines come back into the range of operation of the speed synchronizing apparatus, the apparatus immediately starts to function again.

FIG. 3 illustrates another means for holding the carriage against linear movement. As shown, there is a lock for selectively engaging the shift rod 64 to hold the carriage against the linear movement. In the embodiment illustrated, the lock includes a leaf member 71 having an opening 72 through which the shift rod 64 passes. One end of the leaf member 71 is mounted on a pivot 73 and the other end is arranged for engagement by a rod 74. A spring 75 is engaged with the leaf member 71 intermediate its ends and operates to resiliently urge the leaf member to a position disengaged from the shift rod. A solenoid 78 is conveniently mounted on end wall 44 and arranged to selectively move rod 74 when the solenoid is actuated. When actuated, the rod 74 moves the leaf member 71 to a skewed position so that the edge of opening 72 binds against shift rod 64. When this occurs, either friction clutch can slip and prevent rotation from the respective worm shaft to the worm gear and thereby render the apparatus inoperative. Thus the apparatus may be selectively and easily rendered inoperable.

As can be seen, the present invention provides a simplified apparatus for synchronizing the speeds of multiple engines. The apparatus is operable through a limited linear movement and is selectively rendered inoperable as discussed above. Under panic conditions, however, or when maneuvering the craft 14, it is not necessary that the apparatus be rendered inoperable by the solenoid 78. This is because the aforedescribed stops automatically cause the friction clutches to prevent rotation as described above, at either end of the limited movement of the carriage. In this manner, operation of the manual controls 18 or 24 still allows the craft 14 to be maneuvered without damage to the speed synchronizing apparatus 10.

While an embodiment of the present invention has herein been illustrated and described, this has been done by way of illustration and not limitation and various modifications in structure will appear to those skilled in the art.

What is claimed is:

1. A speed synchronizing apparatus for synchronizing the speed of operation of a slave engine with that of a master engine, comprising: a casing; a pair of parallel, longitudinally, aligned worm shafts rotatably mounted in the casing; drive means connecting each worm shaft to one of the engines for rotating each worm shaft in accordance with the speed of operation of its respective engine; a carriage mounted for limited linear movement in a direction parallel to the worm shafts and operable for comparing the rotations of the worm shafts so that a differential in their speeds of rotation will cause relative linear movement of the carriage; the carriage including worm gear means in mesh with the worm shafts to be rotated thereby and including a shift rod mounted longitudinally in the casing and positioned parallel to the pair of worm shafts; means actuated by linear movement of the shift rod for changing the speed of operation of the slave engine; lock means selectively engageable with the shift rod to prevent linear movement thereof to render the apparatus inoperative for synchronizing; and a clutch interposed between each worm shaft and its associated drive means for ordinarily imparting rotation to the worm gear means and operable to prevent such imparting of rotation when the shift rod is held against linear movement.

2. A second synchronizing apparatus as set forth in claim 1 including first and second spaced stops for engagement by the carriage at either end of said linear movement to limit the same; whereby, when the carriage engages a stop, the clutch means prevents imparting of rotation of the worm gear means.

3. A speed synchronizing apparatus as set forth in claim 1 including control means for selectively operating the lock means; whereby, when the lock means engages the shift rod, the clutch means prevents imparting of rotation to the worm gear means.

4. A speed synchronizing apparatus as set forth in claim 3 wherein the lock means includes: a pivot on the casing, a leaf member having an opening for passage of the shift rod therethrough and pivotally mounted on the pivot, and means resiliently urging the leaf member to a position disengaged from the shift rod; and wherein the control means includes a solenoid for moving the leaf member into locking engagement with the shift rod to prevent longitudinal movement thereof.

5. A speed synchronizing apparatus for synchronizing the speed of rotation of master and slave engines each having a manually operable speed control mechanism, comprising: first and second worm shafts arranged in spaced parallel relation to each other; drive means connecting each shaft to one of the engines for rotating each shaft in accordance with the speed of operation of its respective engine; a shift rod positioned parallel to the first and second shafts; worm gear means in mesh with the first and second shafts and arranged to impart a rectilinear movement to the shift rod correlative to the difference of the rotations of the first and second shafts; means associated with the worm shafts for preventing rotation thereof when the shift rod is held against the rectilinear movement; connecting means actuated by the rectilinear movement of the shift rod and attached to the speed control mechanism of the slave engine for changing the speed of operation of the slave engine; and lock means selectively engageable with the shift rod to prevent rectilinear movement thereof to render the apparatus inoperative for synchronizing.

6. An apparatus as set forth in claim 5 including first and second spaced stops for limiting the rectilinear movement of the shift rod.

7. An apparatus as set forth in claim 5 wherein the apparatus includes a casing on which the worm shafts are rotatably mounted; the worm shafts include a shaft portion which is rotated in accordance with the speed of its respective engine, and a separate worm portion which meshes with the worm gear means and is rotatably mounted on the shaft portion; and the means for preventing imparting of rotation is a clutch associated with each worm shaft for urging the shaft portion and worm portion to rotate as a unit, and for permitting relative rotation of said portions.

8. An apparatus as set forth in claim 7 wherein each clutch comprises a spring between the shaft portion and worm portion of the worm shaft.

9. An apparatus as set forth in claim 5 wherein the lock means includes a leaf member having an opening therethrough for passage of the shift rod, and means resiliently urging the leaf member to a position disengaged from the shift rod; and including a solenoid selectively operable for moving the leaf member into locking engagement with the shift rod to prevent rectilinear movement.

10. An apparatus as set forth in claim 8 wherein the drive means is a flexible cable axially connected to its respective worm shaft at one end thereof; wherein the speed control mechanism includes a fuel supply control at each engine, a throttle at a remote station and extending to the fuel supply control at the master engine for selectively varying the same, and regulator means for setting the fuel supply control at the slave engine at a position approximating that of the other fuel supply control; wherein the connecting means is operatively connected to the slave engine regulator means; and including first and second spaced stops to limit the rectilinear movement within a preselected range so that adjustment of the regulator means is within a corresponding range.

References Cited

UNITED STATES PATENTS

| | | | |
|---|---|---|---|
| 2,256,569 | 9/1941 | Kennedy | 60—97 S |
| 2,307,334 | 1/1943 | Peek | 60—97 S |
| 2,599,885 | 6/1952 | Benua | 60—97 S |
| 3,258,927 | 7/1966 | Herbert | 60—97 S |
| 3,478,470 | 11/1969 | Andres | 74—89.14 |

MARTIN P. SCHWADRON, Primary Examiner

C. F. SCHIMIKOWSKI, Assistant Examiner

U.S. Cl. X.R.

60—97; 74—89.14

PO-1050
(5/69)

UNITED STATES PATENT OFFICE
CERTIFICATE OF CORRECTION

Patent No. 3,623,323        Dated November 30, 1971

Inventor(s) Robert L. Fritz and Fred W. Newburgh

It is certified that error appears in the above-identified patent and that said Letters Patent are hereby corrected as shown below:

Column 6, line 9, "claim 8" should be -- claim 9 --.

Signed and sealed this 13th day of June 1972.

(SEAL)
Attest:

EDWARD M. FLETCHER, JR.        ROBERT GOTTSCHALK
Attesting Officer              Commissioner of Patents